United States Patent
Knapik et al.

(10) Patent No.: US 12,257,633 B2
(45) Date of Patent: Mar. 25, 2025

(54) METAL AND FUSIBLE METAL ALLOY PARTICLES AND RELATED METHODS

(71) Applicant: Xerox Corporation, Norwalk, CT (US)

(72) Inventors: Benjamin Knapik, Etobicoke (CA); Michael S. Hawkins, Cambridge (CA); David Lawton, Burlington (CA); Kimberly D. Nosella, Ancaster (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/823,706

(22) Filed: Aug. 31, 2022

(65) Prior Publication Data

US 2024/0066595 A1 Feb. 29, 2024

(51) Int. Cl.
| | |
|---|---|
| *B22F 9/16* | (2006.01) |
| *B22F 1/052* | (2022.01) |
| *B22F 1/065* | (2022.01) |
| *B22F 1/16* | (2022.01) |
| *B22F 9/24* | (2006.01) |

(52) U.S. Cl.
CPC ............... *B22F 9/16* (2013.01); *B22F 1/052* (2022.01); *B22F 1/065* (2022.01); *B22F 1/16* (2022.01); *B22F 9/24* (2013.01)

(58) Field of Classification Search
CPC ............................................. B22F 2009/0804
See application file for complete search history.

(56) References Cited

U.S. PATENT DOCUMENTS

| | | | | |
|---|---|---|---|---|
| 4,042,374 A | * | 8/1977 | Rasmussen ............. | B22F 3/006 75/364 |
| 5,616,164 A | * | 4/1997 | Ochiai .................... | B23K 35/36 134/2 |
| 5,776,369 A | * | 7/1998 | Dover ....................... | B22F 9/06 516/926 |

(Continued)

FOREIGN PATENT DOCUMENTS

| | | | | |
|---|---|---|---|---|
| CN | 108329835 A | * | 7/2018 | ............... B05D 5/00 |
| CN | 110434350 A | * | 11/2019 | |

(Continued)

OTHER PUBLICATIONS

Chemical Book; "Silicone Oil"; https://www.chemicalbook.com/ChemicalProductProperty_EN_CB7696471.htm; retrieved from internet on Oct. 2, 2023 (Year: 2023).*

(Continued)

*Primary Examiner* — Alexandra M Moore
*Assistant Examiner* — Austin Pollock
(74) *Attorney, Agent, or Firm* — Vorys, Sater, Seymour and Pease LLP

(57) ABSTRACT

A method for producing metal or metal alloy particles may include: mixing a mixture comprising: (a) a metal or a metal alloy, (b) a carrier fluid, and optionally (c) an emulsion stabilizer at a temperature at or greater than a melting point of the metal or the metal alloy to create a dispersion of molten droplets of the metal or the metal alloy dispersed in the carrier fluid; cooling the mixture to below the melting point of the metal or the metal alloy to form metal or metal (Continued)

alloy particles; and separating the metal or metal alloy particles from the carrier fluid, wherein the metal or metal alloy particles comprise the metal or the metal alloy and the emulsion stabilizer, if included.

17 Claims, 7 Drawing Sheets

(56) References Cited

U.S. PATENT DOCUMENTS

| | | | | |
|---|---|---|---|---|
| 10,124,310 | B2* | 11/2018 | Thuo | B01J 35/0006 |
| 10,266,925 | B2* | 4/2019 | Thuo | B23K 35/3013 |
| 2003/0047034 | A1* | 3/2003 | Ono | B23K 35/0244 |
| | | | | 75/331 |
| 2003/0177865 | A1* | 9/2003 | Ono | B22F 9/06 |
| | | | | 75/331 |
| 2004/0211291 | A1* | 10/2004 | Ono | B23K 35/0244 |
| | | | | 75/331 |
| 2008/0264204 | A1* | 10/2008 | Larink | B22F 9/026 |
| | | | | 75/338 |
| 2009/0053523 | A1* | 2/2009 | Kawasaki | B22F 9/02 |
| | | | | 568/303 |
| 2019/0067690 | A1* | 2/2019 | Chen | B22F 1/056 |
| 2020/0015354 | A1* | 1/2020 | Chopra | H01L 24/75 |
| 2020/0038949 | A1* | 2/2020 | Song | C09D 11/38 |
| 2020/0130064 | A1* | 4/2020 | Furusawa | B22F 1/148 |
| 2020/0406347 | A1* | 12/2020 | Song | B22F 9/24 |
| 2021/0070993 | A1 | 3/2021 | Farrugia et al. | |

FOREIGN PATENT DOCUMENTS

| | | | | |
|---|---|---|---|---|
| JP | 09049007 | A * | 2/1997 | |
| JP | 2003166007 | A * | 6/2003 | B22F 9/06 |
| JP | 4097490 | B2 | 6/2008 | |
| JP | 2020169348 | A * | 10/2020 | |

OTHER PUBLICATIONS

Elkem; "What are Silicone Oils"; https://www.elkem.com/products/silicones/oils/; retrieved on Oct. 2, 2023 from wayback machine; URL https://www.elkem.com/silicones/technologies/basic-silicones-products/oils/ ; Jan. 15, 2021 (Year: 2021).*

* cited by examiner

METAL AND FUSIBLE METAL ALLOY PARTICLES AND RELATED METHODS

FIELD OF INVENTION

The present disclosure relates to metal and metal alloy particles and related methods.

BACKGROUND

Selective laser sintering (SLS) is a type of known as additive manufacturing that produces plastic and metal parts by using a laser to sinter consecutive layers of polymeric powder or metal powder. Commercial metallic powders can be made from a melt atomization procedure, commonly called gas atomization or high pressure water atomization. These methods are used for high performance metals such as aluminums and steels, but also for fusible metal alloys that are commonly used as solder paste in the electronics industry. In the atomization process metal wire is fed through a melt chamber where the metal is sputtered into a cooling region where the metal drops solidify and form into spheres. The particle distribution characteristics and morphology resulting from atomization is tuned through feed rates, temperature, and cooling rate. Atomization is an energy and capital intensive manufacturing process that is often limited by material properties and maximum throughput.

SUMMARY OF INVENTION

The present disclosure relates to metal and metal alloy particles and related methods. More specifically, the present disclosure includes compositions, methods of making, and applications for metal and metal alloy particles.

An example method of the present disclosure comprises: mixing a mixture comprising: (a) a metal or a metal alloy, (b) a carrier fluid, and optionally (c) an emulsion stabilizer at a temperature at or greater than a melting point of the metal or the metal alloy to create a dispersion of molten droplets of the metal or the metal alloy dispersed in the carrier fluid; cooling the mixture to below the melting point of the metal or the metal alloy to form metal or metal alloy particles; and separating the metal or metal alloy particles from the carrier fluid, wherein the metal or metal alloy particles comprise the metal or the metal alloy and the emulsion stabilizer, if included. The metal or metal alloy particles may be used to produce a selective laser sintered article.

An example composition of the present disclosure comprises: metal or metal alloy particles comprising (a) a metal or a metal alloy and (b) an emulsion stabilizer. Said composition may be used to produce a selective laser sintered article. For example, a method may comprise: depositing the composition upon a surface; and once deposited, heating at least a portion of the metal or metal alloy particles to promote consolidation thereof and form a consolidated body. The heating may be achieved by selective laser sintering. The consolidated body may have a void percentage of about 5% or less.

BRIEF DESCRIPTION OF THE DRAWINGS

The following figures are included to illustrate certain aspects of the disclosure, and should not be viewed as exclusive configurations. The subject matter disclosed is capable of considerable modifications, alterations, combinations, and equivalents in form and function, as will occur to those skilled in the art and having the benefit of this disclosure.

DETAILED DESCRIPTION

Figure 1:
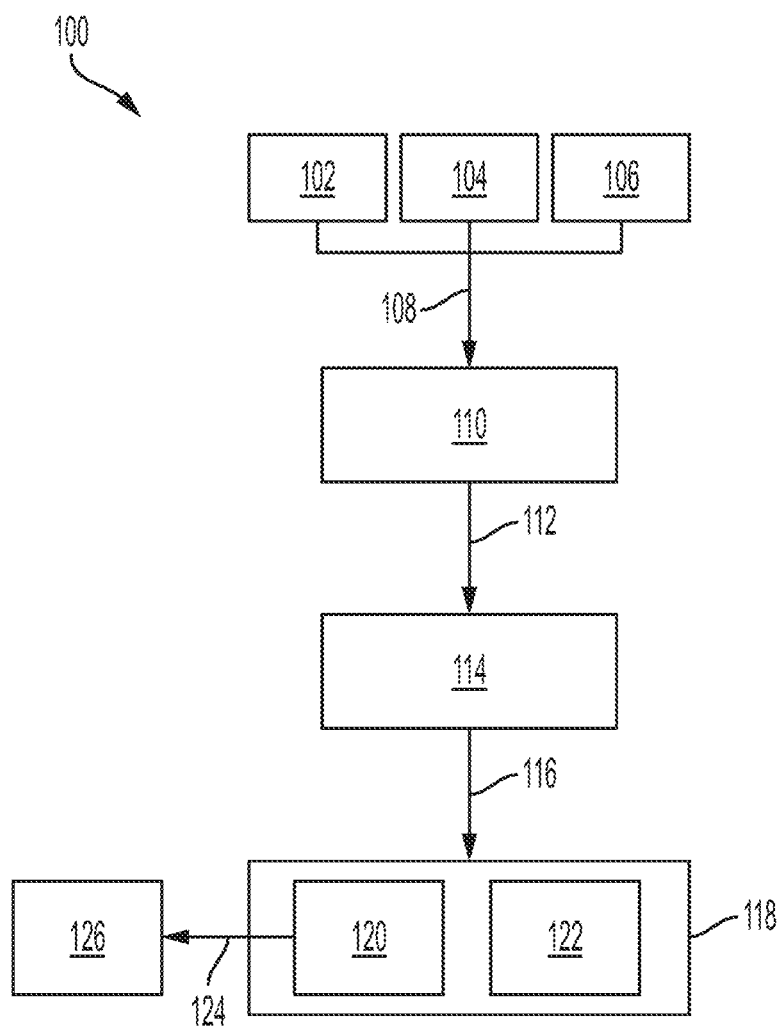
FIG. 1 is a flow chart of a nonlimiting example method of the present disclosure.

The present disclosure relates to metal and metal alloy (preferably fusible metal alloy) particles and related methods. More specifically, the present disclosure includes compositions, methods of making, and applications for metal and metal alloy particles. The methods of making such particles uses a two-phase system for forming molten metal or metal alloy droplets in a carrier fluid (e.g., polydimethylsiloxane oil (PDMS)) that when cooled solidify into metal or metal alloy particles. Advantageously, such methods may be continuous methods that allow for commercial scalability for producing the metal or metal alloy particles. Also, the amount of energy to produce said metal or metal alloy particles appears to be lower, which reduces the cost of production.

Definitions and Test Methods

Numerical ranges used herein include the numbers recited in the range. For example, the numerical range "from 1 wt % to 10 wt %" includes 1 wt % and 10 wt % within the recited range.

The melting point of a metal, unless otherwise specified, is the melting point recited in the CRC Handbook of Chemistry and Physics $102^{nd}$ Edition. The melting point of a fusible metal alloy, unless otherwise specified, is determined by ASTM B774-00 with 10° C./min ramping and cooling rates.

As used herein, the term "fusible metal alloy" refers to a mixture of metals as an alloy that has a melting point at a temperature less than 315° C.

As used herein, the term "immiscible" refers to a mixture of components that, when combined, form two or more phases that have less than 5 wt % solubility in each other at ambient pressure and at room temperature or the melting point of the component if it is solid at room temperature. For example, polyethylene oxide having 10,000 g/mol molecular weight is a solid room temperature and has a melting point of 65° C. Therefore, said polyethylene oxide is immiscible with a material that is liquid at room temperature if said material and said polyethylene oxide have less than 5 wt % solubility in each other at 65° C.

As used herein, the term "oxide" refers to both metal oxides and non-metal oxides. For purposes of the present disclosure, silicon is considered to be a metal.

As used herein, the term "embed" relative to particles (e.g., nanoparticles) and a surface of a metal or metal alloy particle (e.g., metal or fusible metal alloy particle) refers to the particle being at least partially extending into the surface of the metal or metal alloy particle (e.g., metal or fusible metal alloy particle) such that metal or metal alloy (e.g., metal or fusible metal alloy particle) is in contact with the nanoparticle to a greater degree than would be if the nanoparticle were simply laid on the surface of the metal or metal alloy particle.

Herein, D10, D50, D90, and diameter span are primarily used herein to describe particle sizes. As used herein, the term "D10" refers to a diameter below which 10% (on a volume-based distribution, unless otherwise specified) of the particle population is found. As used herein, the terms "D50," "average particle diameter," and "average particle size" refers to a diameter below which 50% (on a volume-based median average, unless otherwise specified) of the particle population is found. As used herein, the term "D90" refers to a diameter below which 90% (on a volume-based distribution, unless otherwise specified) of the particle population is found. As used herein, the terms "diameter span" and "span" and "span size" when referring to diameter provide an indication of the breadth of the particle size distribution and is calculated as (D90-D10)/D50.

Particle diameters and particle size distributions are determined by light-scattering techniques using a Malvern MASTERSIZER™ 3000. For light-scattering techniques, the control samples were glass beads with a diameter within the range of 15 μm to 150 μm under the tradename Quality Audit Standards QAS4002 ™ obtained from Malvern Analytical Ltd. Samples were analyzed as dry powders, unless otherwise indicated. The particles analyzed were dispersed in air and analyzed using the AERO S™ dry powder dispersion module with the MASTERSIZER™ 3000. The particle sizes were derived using instrument software from a plot of volume density as a function of size.

As used herein, when referring to sieving, pore/screen sizes are described per U.S.A. Standard Sieve (ASTM E11-17).

As used herein, the term "circularity" relative to the particles refers to how close the particle is to a perfect sphere. To determine circularity, optical microscopy images using flow particle imaging are taken of the particles. The perimeter (P) and area (A) of the particle in the plane of the microscopy image is calculated (e.g., using a SYSMEX FPIA 3000 particle shape and particle size analyzer, available from Malvern Instruments). The circularity of the particle is $C_{EA}/P$, where $C_{EA}$ is the circumference of a circle having the area equivalent to the area (A) of the actual particle. Herein, the circularity is based on three runs through a SYSMEX FPIA 3000 particle shape and particle size analyzer, where 6,000 to 10,000 particles are analyzed per run. The reported circularity is the median average circularity based on particle number. In the analysis, a threshold for distinguishing the greyscale levels between the background pixels and the particle pixels (e.g., to correct for non-uniform illumination conditions) was set at 90% of the background modal value.

As used herein, the term "shear" refers to stirring or a similar process that induces mechanical agitation in a fluid.

Angle of repose is a measure of the flowability of a powder. Angle of repose measurements were determined using a Hosokawa Micron Powder Characteristics Tester PT-R using ASTM D6393-14 "Standard Test Method for Bulk Solids Characterized by Carr Indices."

Hausner ratio ($H_r$) is a measure of the flowability of a powder and is calculated by $H_r = \rho_{tap}/\rho_{bulk}$, where $\rho_{bulk}$ is the bulk density per ASTM D6393-14 and $\rho_{tap}$ is the tapped density per ASTM D6393-14.

As used herein, viscosity of carrier fluids is the kinematic viscosity at 25° C., unless otherwise specified, measured per ASTM D445-19. For commercially procured carrier fluids (e.g., polydimethylsiloxane oil (PDMS)), the kinematic viscosity data cited herein was provided by the manufacturer, whether measured according to the foregoing ASTM or another standard measurement technique.

Metal and Metal Alloy Particles and Methods of Making

The methods and compositions described herein relate to highly spherical metal and metal alloy particles that comprise a metal or a metal alloy. For example, the present disclosure includes methods that comprise: mixing a mixture comprising: (a) a metal or a metal alloy, (b) a carrier fluid that is immiscible with the metal or the metal alloy, and optionally (c) an emulsion stabilizer at a temperature greater than a melting point or the metal or the metal alloy and at a shear rate sufficiently high to disperse the metal or the metal alloy (e.g., as molten droplets) in the carrier fluid; cooling the mixture to below the foregoing melting point to form spherical metal or metal alloy particles; and separating the spherical metal or metal alloy particles from the carrier fluid.

The methods and compositions described herein relate to highly spherical metal and fusible metal alloy particles that comprise a metal or a fusible metal alloy. For example, the present disclosure includes methods that comprise: mixing a mixture comprising: (a) a metal or a fusible metal alloy, (b) a carrier fluid that is immiscible with the metal or the fusible metal alloy, and optionally (c) an emulsion stabilizer at a temperature greater than a melting point or the metal or the fusible metal alloy and at a shear rate sufficiently high to disperse the metal or the fusible metal alloy (e.g., as molten droplets) in the carrier fluid; cooling the mixture to below the foregoing melting point to form spherical metal or fusible metal alloy particles; and separating the spherical metal or fusible metal alloy particles from the carrier fluid.

FIG. 1 is a flow chart of a nonlimiting example method 100 of the present disclosure. A metal or metal alloy (e.g., metal or fusible metal alloy 102), carrier fluid 104, and optionally other additives 106 (e.g., an emulsion stabilizer) are combined 108 to produce a mixture 110. The components 102, 104, and 106 can be added individually or in a blend of components in any order and include mixing and/or heating during the process of combining 108 the components 102, 104, and 106. For example, the metal or fusible metal alloy 102 may be preheated before adding to a preheated carrier fluid 104. In another example, the carrier fluid 104 and emulsion stabilizer may be premixed and preheated before addition of the metal or fusible metal alloy 102 (which may be preheated also). In another example, the metal or fusible metal alloy 102 may be preheated before adding to a preheated carrier fluid 104, after which the emulsion stabilizer may be added to the carrier fluid.

To mitigate the wear of solid metal in the combining step on the apparatus in which the mixing is occurring, the metal or fusible metal alloy 102 preferably is molten upon addition to the apparatus or soon thereafter. For example, the metal or fusible metal alloy 102 may be preheated to within about 10° C. (or within about 5° C.) (above or below) of the melting point and added to a carrier fluid 104 that is also preheated. For example, the carrier fluid 104 may be preheated to within about 30° C. (or within about 20° C., or within about 10° C.) (above or below) of the melting point and combined with the metal or fusible metal alloy 102 that is also preheated.

The mixture 110 is processed 112 (or mixed 112) by applying sufficiently high shear to the mixture 112 at a temperature greater than the melting point of the metal or fusible metal alloy 102 to form a dispersion 114 comprising molten metal or fusible metal alloy droplets dispersed in the carrier fluid. When present, emulsion stabilizers (e.g., oxide nanoparticles) may be present at the interface between the molten metal or fusible metal alloy droplets and the carrier fluid to stabilize the molten metal or fusible metal alloy droplets and mitigate coalescence of said droplets. Without being limited by theory, it is believed that, all other factors being the same, increasing shear should decrease the size of the molten metal or fusible metal alloy droplets in the carrier fluid. However, at some point there may be diminishing returns on increasing shear and decreasing droplet size or there may be disruptions to the droplet contents that decrease the quality of particles produced therefrom.

The mixing apparatuses used for the processing 112 (or mixing 112) to produce the dispersion 114 should be capable of maintaining the dispersion 114 at a temperature greater than the necessary melting point of the metal or fusible metal alloy 102 in the mixture 110 and applying a shear rate sufficient to disperse the molten metal or fusible metal alloy in the carrier fluid as droplets.

Examples of mixing apparatuses used for the processing to produce the dispersion 114 may include, but are not limited to, extruders (e.g., continuous extruders, batch extruders, and the like), stirred reactors, blenders, reactors with inline homogenizer systems, the like, and apparatuses derived therefrom.

The processing and forming the dispersion 114 at suitable process conditions (e.g., temperature, shear rate, and the like) for a set period of time.

The temperature of the processing and forming the dispersion 114 should be a temperature greater than the melting point of the metal or fusible metal alloy 102 and less than the decomposition temperature of any components 102, 104, and 106 in the mixture 110. For example, the temperature of processing 112 (or mixing 112) and forming the dispersion 114 may be about 1° C. to about 50° C. (or about 1° C. to about 15° C., or about 1° C. to about 25° C., or about 5° C. to about 30° C., or about 20° C. to about 50° C.) greater than the melting point of the metal or fusible metal alloy 102 and less than the decomposition temperature of any components 102, 104, and 106 in the mixture 110.

The shear rate of processing 112 (or mixing 112) and forming the dispersion 114 should be sufficiently high to disperse the molten metal or fusible metal alloy in the carrier fluid as droplets. Said droplets may comprise droplets having a diameter of about 1000 µm or less (or about 1 µm to about 1000 µm, or about 1 µm to about 50 µm, or about 10 µm to about 100 µm, or about 10 µm to about 250 µm, or about 50 µm to about 500 µm, or about 250 µm to about 750 µm, or about 500 µm to about 1000 µm).

The time for maintaining said temperature and shear rate for processing 112 (or mixing 112) and forming the dispersion 114 may be 10 seconds to 18 hours or longer (or 10 seconds to 30 minutes, or 5 minutes to 1 hour, or 15 minutes to 2 hours, or 1 hour to 6 hours, or 3 hours to 18 hours). Without being limited by theory, it is believed that a steady state of droplet sizes will be reached at which point processing can be stopped. That time may depend on, among other things, the temperature, shear rate, and the components 102, 104, 106, 108 in the mixture 112.

The dispersion 114 inside and/or outside the mixing vessel is then cooled 116 to solidify the droplets into metal or metal alloy particles (e.g., metal or fusible metal alloy particles 120). Cooling 116 can be slow (e.g., allowing the dispersion to cool under ambient conditions) to fast (e.g., quenching). For example, the rate of cooling may range from about 10° C./hour to about 100° C./second to almost instantaneous with quenching (for example in dry ice) (or about 10° C./hour to about 60° C./hour, or about 0.5° C./minute to about 20° C./minute, or about 1° C./minute to about 5° C./minute, or about 10° C./minute to about 60° C./minute, or about 0.5° C./second to about 10° C./second, or about 10° C./second to about 100° C./second).

During cooling 116, little to no shear may be applied to the dispersion. In some instances, the shear applied during mixing may be applied during cooling 116.

The cooled mixture 118 resulting from cooling 116 the dispersion 114 may comprise solidified metal or fusible metal alloy particles 120 and other components 122 (e.g., the carrier fluid, excess emulsion stabilizer, and the like). The cooled mixture 118 can then be treated 124 to isolate the metal or fusible metal alloy particles 120 from other components 122 (e.g., the carrier fluid 106, excess emulsion stabilizer, and the like) and wash or otherwise purify the metal or fusible metal alloy particles 120. The solidified metal or fusible metal alloy particles 120 may be dispersed in the carrier fluid and/or settled in the carrier fluid.

The metal or fusible metal alloy particles 120 may optionally be further purified or otherwise treated 124 to yield purified metal or metal alloy particles (e.g., purified metal or fusible metal alloy particles 126). Suitable treatments include, but are not limited to, washing, filtering, centrifuging, decanting, the like, and any combination thereof.

Solvents used for washing the metal or fusible metal alloy particles should generally be (a) miscible with the carrier fluid and (b) nonreactive (e.g., non-swelling and non-dissolving) with the metal or fusible metal alloy particles. Examples of solvents include, but are not limited to, hydrocarbon solvents (e.g., pentane, hexane, heptane, octane, cyclohexane, cyclopentane, decane, dodecane, tridecane, and tetradecane), aromatic hydrocarbon solvents (e.g., benzene, toluene, xylene, 2-methyl naphthalene, and cresol), ether solvents (e.g., diethyl ether, tetrahydrofuran, diisopropyl ether, and dioxane), ketone solvents (e.g., acetone and methyl ethyl ketone), alcohol solvents (e.g., methanol, ethanol, isopropanol, and n-propanol), ester solvents (e.g., ethyl acetate, methyl acetate, butyl acetate, butyl propionate, and butyl butyrate), halogenated solvents (e.g., chloroform, bromoform, 1,2-dichloromethane, 1,2-dichloroethane, carbon tetrachloride, chlorobenzene, and hexafluoroisopropanol), water, the like, and any combination thereof.

Solvent may be removed from the metal or fusible metal alloy particles by drying using an appropriate method such as air-drying, heat-drying, reduced pressure drying, freeze drying, or a hybrid thereof. The heating may be performed preferably at a temperature lower than the melting point of the metal or fusible metal alloy (e.g., about 50° C. to about 150° C.).

Advantageously, carrier fluids and washing solvents of the systems and methods described herein can be recycled and reused. One skilled in the art will recognize any necessary cleaning of used carrier fluid and solvent necessary in the recycling process.

The metal or fusible metal alloy particles, after separation from the other components, may optionally be further purified or otherwise treated. For example, to narrow the particle size distribution (or reduce the diameter span), the metal or fusible metal alloy particles can be passed through a sieve having a pore size of about 10 µm to about 250 µm (or about 10 µm to about 100 µm, or about 50 µm to about 200 µm, or about 150 µm to about 250 µm).

In some instances, a surfactant used as an emulsion stabilizer in making the metal or fusible metal alloy particles may be unwanted in downstream applications. Accordingly, yet another example purification technique may include at least substantial removal of the surfactant from the metal or fusible metal alloy particles (e.g., by washing and/or pyrolysis).

The metal or fusible metal alloy particles 120/126 may be characterized by composition, physical structure, and the like.

The metal or fusible metal alloy particles 120/126 may have a BET surface area of about 10 m$^2$/g to about 500 m$^2$/g (or about 10 m$^2$/g to about 150 m$^2$/g, or about 25 m$^2$/g to about 100 m$^2$/g, or about 100 m$^2$/g to about 250 m$^2$/g, or about 250 m$^2$/g to about 500 m$^2$/g).

The metal or fusible metal alloy particles 120/126 may have a D10 of about 0.1 µm to about 125 µm (or about 0.1 µm to about 5 µm, or about 1 µm to about 10 µm, or about 5 µm to about 30 µm, or about 1 µm to about 25 µm, or about 25 µm to about 75 µm, or about 50 inn to about 85 µm, or about 75 µm to about 125 inn), a D50 of about 0.5 µm to about 200 inn (or about 0.5 µm to about 10 µm, or about 5 µm to about 50 µm, or about 30 µm to about 100 inn, or about 30 µm to about 70 µm, or about 25 µm to about 50 µm, or about 50 µm to about 100 µm, or about 75 µm to about 150 µm, or about 100 µm to about 200 inn), and a D90 of about 3 µm to about 300 µm (or about 3 µm to about 15 µm, or about 10 µm to about 50 µm, or about 25 µm to about 75 µm, or about 70 µm to about 200 µm, or about 60 µm to about 150 inn, or about 150 µm to about 300 inn), wherein D10<D50<D90. The metal or fusible metal alloy particles 120/126 may also have a diameter span of about 0.2 to about 10 (or about 0.2 to about 0.5, or about 0.4 to about 0.8, or about 0.5 to about 1, or about 1 to about 3, or about 2 to about 5, or about 5 to about 10). Without limitation, diameter span values of 1.0 or greater are considered broad, and diameter spans values of 0.75 or less are considered narrow. Preferably, the metal or fusible metal alloy particles 120/126 have a diameter span of about 0.2 to about 1.

In a first nonlimiting example, the metal or fusible metal alloy particles 120/126 may have a D10 of about 0.1 µm to about 10 µm, a D50 of about 0.5 µm to about 25 µm, and a D90 of about 3 µm to about 50 µm, wherein D10<D50<D90. Said metal or fusible metal alloy particles 120/126 may have a diameter span of about 0.2 to about 2.

In a second nonlimiting example, the metal or fusible metal alloy particles 120/126 may have a D10 of about 5 µm to about 30 µm, a D50 of about 30 µm to about 70 µm, and a D90 of about 70 µm to about 120 µm, wherein D10<D50<D90. Said metal or fusible metal alloy particles 120/126 may have a diameter span of about 1.0 to about 2.5.

In a third nonlimiting example, the metal or fusible metal alloy particles 120/126 may have a D10 of about 25 µm to about 60 µm, a D50 of about 60 µm to about 110 µm, and a D90 of about 110 µm to about 175 µm, wherein D10<D50<D90. Said metal or fusible metal alloy particles 120/126 may have a diameter span of about 0.6 to about 1.5.

In a fourth nonlimiting example, the metal or fusible metal alloy particles 120/126 may have a D10 of about 75 µm to about 125 µm, a D50 of about 100 µm to about 200 µm, and a D90 of about 125 µm to about 300 µm, wherein D10<D50<D90. Said metal or fusible metal alloy particles 120/126 may have a diameter span of about 0.2 to about 1.2.

In a fifth nonlimiting example, the metal or fusible metal alloy particles 120/126 may have a D10 of about 1 µm to about 50 µm (or about 5 µm to about 30 µm, or about 1 µm to about 25 µm, or about 25 µm to about 50 inn), a D50 of about 25 µm to about 100 µm (or about 30 µm to about 100 µm, or about 30 µm to about 70 µm, or about 25 µm to about 50 µm, or about 50 µm to about 100 inn), and a D90 of about 60 µm to about 300 µm (or about 70 µm to about 200 µm, or about 60 µm to about 150 µm, or about 150 µm to about 300 inn), wherein D10<D50<D90. The metal or fusible metal alloy particles 120/126 may also have a diameter span of about 0.4 to about 3 (or about 0.6 to about 2, or about 0.4 to about 1.5, or about 1 to about 3).

The metal or fusible metal alloy particles 120/126 may have a circularity of about 0.9 or greater (or about 0.90 to about 1.0, or about 0.93 to about 0.99, or about 0.95 to about 0.99, or about 0.97 to about 0.99, or about 0.98 to 1.0).

The metal or fusible metal alloy particles 120/126 may have an angle of repose of about 25° to about 45° (or about 25° to about 35°, or about 30° to about 40°, or about 35° to about 45°).

The metal or fusible metal alloy particles 120/126 may have a Hausner ratio of about 1.0 to about 1.5 (or about 1.0 to about 1.2, or about 1.1 to about 1.3, or about 1.2 to about 1.35, or about 1.3 to about 1.5).

The metal or fusible metal alloy may be present in the mixture (e.g., mixture 110 of FIG. 1) at about 5 wt % to about 75 wt % (or about 5 wt % to about 25 wt %, or about 10 wt % to about 30 wt %, or about 20 wt % to about 40 wt %, or about 30 wt % to about 50 wt %, or about 40 wt % to about 60 wt %, or about 50 wt % to about 70 wt %, or about 55 wt % to about 75 wt %) of the mixture.

The metal or fusible metal alloy may be present in the metal or fusible metal alloy particles (e.g., metal or fusible metal alloy particles 120/126 of FIG. 1) at about 80 wt % to about 100 wt % (or about 80 wt % to about 99.9 wt %, or about 80 wt % to about 90 wt %, or about 85 wt % to about 95 wt %, or about 90 wt % to about 99 wt %, or about 95 wt % to about 100 wt %) of the metal or fusible metal alloy particles.

Examples of metals may include, but are not limited to, cesium, gallium, rubidium, potassium, sodium, indium, lithium, and the like. Metal may have a melting point of about 350° C. or less (or about 50° C. to about 350° C., or about 50° C. to about 150° C., or about 100° C. to about 215° C., or about 175° C. to about 300° C., or about 200° C. to about 350° C.). When using a metal, the atmosphere during processing may need to be controlled to limit oxygen and/or water, for example, by using an inert and/or dry gas.

Fusible metal alloys may include one or more of: tin, antimony, copper, bismuth, zinc, silver, the like, and any combination thereof. Fusible metal alloys may have a melting point of about 315° C. or less (or about 50° C. to about 315° C., or about 50° C. to about 150° C., or about 100° C. to about 215° C., or about 175° C. to about 275° C., or about 200° C. to about 315° C.).

Examples of fusible metal alloys may include, but are not limited to, 92.0% Sn, 7.0% Sb, 0.3% Cu with melting point 273° C.; SAC0248 (95.0% Sn, 0.2% Ag, 4.8% Cu with melting point 227° C.); SAC405 (95.5% Sn, 4.0% Ag, 0.5% Cu with melting point 217° C.); KAPP9 (91.0% Sn, 9.0% Zn with melting point 199° C.); BI58 (58.0% Bi, 42.0% Sn with melting point 138° C.); FIELD'S METAL (51.0% In, 32.5% Bi, 16.5% Sn with melting point 62° C.); and the like.

The carrier fluid should be chosen such that at the various processing temperatures (e.g., from room temperature to process temperature) the metal or fusible metal alloy and the carrier fluid are immiscible. An additional factor that may be considered is the differences in (e.g., a difference or a ratio of) viscosity at process temperature between the metal or fusible metal alloy and the carrier fluid. The differences in viscosity may affect droplet breakup and particle size distribution. Without being limited by theory, it is believed that when the viscosities of the metal or fusible metal alloy and the carrier fluid are too similar, the circularity of the product as a whole may be reduced where the particles are more ovular and more elongated structures are observed.

Suitable carrier fluids may have a viscosity at 25° C. of about 1,000 cSt to about 150,000 cSt (or about 1,000 cSt to about 60,000 cSt, or about 40,000 cSt to about 100,000 cSt, or about 75,000 cSt to about 150,000 cSt). For example, suitable carrier fluids may have a viscosity at 25° C. of about 10,000 cSt to about 60,000 cSt.

Examples of carrier fluids may include, but are not limited to, silicone oil, fluorinated silicone oils, perfluorinated silicone oils, polyethylene glycols, alkyl-terminal polyethylene glycols (e.g., C1-C4 terminal alkyl groups like tetraethylene glycol dimethyl ether (TDG)), paraffins, liquid petroleum jelly, vison oils, turtle oils, soya bean oils, perhydrosqualene, sweet almond oils, calophyllum oils, palm oils, parleam oils, grapeseed oils, sesame oils, maize oils, rapeseed oils, sunflower oils, cottonseed oils, apricot oils, castor oils, avocado oils, jojoba oils, olive oils, cereal germ oils, esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxyalkylenes, the like, and any combination thereof. Examples of silicone oils include, but are not limited to, polydimethylsiloxane (PDMS), methylphenylpolysiloxane, an alkyl modified polydimethylsiloxane, an alkyl modified methylphenylpolysiloxane, an amino modified polydimethylsiloxane, an amino modified methylphenylpolysiloxane, a fluorine modified polydimethylsiloxane, a fluorine modified methylphenylpolysiloxane, a polyether modified polydimethylsiloxane, a polyether modified methylphenylpolysiloxane, the like, and any combination thereof. When the carrier fluid comprises two or more of the foregoing, the carrier fluid may have one or more phases. For example, polysiloxanes modified with fatty acids and polysiloxanes modified with fatty alcohols (preferably with similar chain lengths for the fatty acids and fatty alcohols) may form a single-phase carrier fluid. In another example, a carrier fluid comprising a silicone oil and an alkyl-terminal polyethylene glycol may form a two-phase carrier fluid. In at least one embodiment, the carrier fluid is polydimethylsiloxane (PDMS).

The carrier fluid may be present in the mixture at about 60 wt % to about 95 wt % (or about 75 wt % to about 95 wt %, or about 70 wt % to about 90 wt %, or about 65 wt % to about 80 wt %, or about 60 wt % to about 75 wt %) of the mixture.

Other additives like emulsion stabilizers may be included in the mixture and resultant metal or fusible metal alloy particles.

The emulsion stabilizers used in the methods and compositions of the present disclosure may comprise nanoparticles (e.g. oxide nanoparticles, carbon black, polymer nanoparticles, and combinations thereof), surfactants, the like, and any combination thereof.

Oxide nanoparticles may be metal oxide nanoparticles, non-metal oxide nanoparticles, or mixtures thereof. Examples of oxide nanoparticles include, but are not limited to, silica, titania, zirconia, alumina, iron oxide, copper oxide, tin oxide, boron oxide, cerium oxide, thallium oxide, tungsten oxide, the like, and any combination thereof. Mixed metal oxides and/or non-metal oxides, like aluminosilicates, borosilicates, and aluminoborosilicates, are also inclusive in the term metal oxide. The oxide nanoparticles may be hydrophilic or hydrophobic, which may be native to the particle or a result of surface treatment of the particle. For example, a silica nanoparticle having a hydrophobic surface treatment, like dimethyl silyl, trimethyl silyl, or the like, may be used in methods and compositions of the present disclosure. Additionally, silica with functional surface treatments like methacrylate functionalities may be used in methods and compositions of the present disclosure. Unfunctionalized oxide nanoparticles may also be suitable for use as well.

Commercially available examples of silica nanoparticles include, but are not limited to, AEROSIL® particles available from Evonik (e.g., AEROSIL® R812S (about 7 nm average diameter silica nanoparticles having a hydrophobically modified surface and a BET surface area of 260±30 $m^2/g$), AEROSIL® RX50 (about 40 nm average diameter silica nanoparticles having a hydrophobically modified surface and a BET surface area of 35±10 $m^2/g$), AEROSIL® 380 (silica nanoparticles having a hydrophilically modified surface and a BET surface area of 380±30 $m^2/g$), the like, and any combination thereof.

Carbon black is another type of nanoparticle that may be present as an emulsion stabilizer in the compositions and methods disclosed herein. Various grades of carbon black will be familiar to one having ordinary skill in the art, any of which may be used herein. Other nanoparticles capable of absorbing infrared radiation may be used similarly.

Polymer nanoparticles are another type of nanoparticle that may be present as an emulsion stabilizer in the disclosure herein. Suitable polymer nanoparticles may include one or more polymers that are thermosetting and/or crosslinked, such that they do not melt when processed by melt emulsification according to the disclosure herein. High molecular weight thermoplastic polymers having high melting or decomposition points may similarly comprise suitable polymer nanoparticle emulsion stabilizers.

Surfactants may be anionic, cationic, nonionic, or zwitterionic. Examples of surfactants include, but are not limited to, sodium dodecyl sulfate, sorbitan oleates, poly [dimethylsiloxane-co-[3-(2-(2-hydroxyethoxy)ethoxy)propylmethylsiloxane]], docusate sodium (sodium 1,4-bis(2-ethylhexoxy)-1,4-dioxobutane-2-sulfonate), the like, and any combination thereof. Commercially available examples of surfactants include, but are not limited to, CALFAX® DB-45 (sodium dodecyl diphenyl oxide disulfonate, available from Pilot Chemicals), SPAN® 80 (sorbitan maleate non-ionic surfactant), MERPOL® surfactants (available from Stepan Company), TERGITOL™ TMN-6 (a water-soluble, nonionic surfactant, available from DOW), TRITON™ X-100 (octyl phenol ethoxylate, available from SigmaAldrich), IGEPAL® CA-520 (polyoxyethylene (5) isooctylphenyl ether, available from SigmaAldrich), BRIJ® S 10 (polyethylene glycol octadecyl ether, available from SigmaAldrich), the like, and any combination thereof.

Surfactants may be included in the mixture (e.g., mixture 110 of FIG. 1) or may be present in the metal or fusible metal alloy particles (e.g., metal or fusible metal alloy particles 120/126 of FIG. 1) in an amount of about 0.01 wt % to about 2 wt % (or about 0.01 wt % to about 1 wt %, or about 0.5 wt % to about 2 wt %) based on a total weight of metal or fusible metal alloy in the mixture or metal or fusible metal alloy in the metal or fusible metal alloy particles. Alternatively, the mixture may comprise no (or be absent of) surfactant.

The emulsion stabilizer (e.g., a surfactant, a nanoparticle, or both) may be included in the mixture (e.g., mixture 110 of FIG. 1) or the metal or fusible metal alloy particles (e.g., metal or fusible metal alloy particles 120/126 of FIG. 1) in an amount of about 0.01 wt % to about 2 wt % (or about 0.01 wt % to about 1 wt %, or about 0.1 wt % to about 2 wt %)

based on a total weight of metal or fusible metal alloy in the mixture or metal or fusible metal alloy in the metal or fusible metal alloy particles.

A weight ratio of nanoparticles to surfactant in the emulsion stabilizer in the mixture (e.g., mixture 110 of FIG. 1) or present in the metal or fusible metal alloy particles (e.g., metal or fusible metal alloy particles 120/126 of FIG. 1) may be about 1:10 to about 10:1 (or about 1:10 to about 1:1, or about 1:5 to about 5:1, or about 1:1 to about 10:1).

The emulsion stabilizers may be at the interface between the molten metal or fusible metal alloy and the carrier fluid in the dispersion. As a result, when the mixture is cooled, the emulsion stabilizers remain at, or in the vicinity of, said interface. Therefore, the structure of the metal or fusible metal alloy particles is, in general when emulsion stabilizers are used, includes emulsion stabilizers (a) dispersed on an outer surface of the metal or fusible metal alloy particles and/or (b) embedded in an outer portion (e.g., outer 1 vol %) of the metal or fusible metal alloy particles. That is, emulsion stabilizers, when included, may be deposited as coating, perhaps a uniform coating, on the metal or fusible metal alloy particles. In some instances, which may be dependent upon nonlimiting factors such as the temperature (including cooling rate), the composition of metal or fusible metal alloy, and the types and sizes of emulsion stabilizers, the nanoparticles of emulsion stabilizers may become at least partially embedded within the outer surface of metal or fusible metal alloy particles. Even without embedment taking place, at least a portion of the nanoparticles within emulsion stabilizers may remain robustly associated with metal or fusible metal alloy particles to facilitate their further use. In contrast, dry blending already-formed metal or fusible metal alloy particulates (e.g., formed by cryogenic grinding or precipitation processes) with a flow aid like silica nanoparticles does not result in a robust, uniform coating of the flow aid upon the metal or fusible metal alloy particulates.

At least a portion of the surfactant, if used, may be associated with the outer surface as well. The coating of the emulsion stabilizer (e.g., comprising surfactants and/or nanoparticles) may be disposed substantially uniformly upon the outer surface. As used herein with respect to a coating, the term "substantially uniform" refers to even coating thickness in surface locations covered by the coating composition (e.g., nanoparticles and/or surfactant), particularly the entirety of the outer surface. The emulsion stabilizers may form a coating that covers at least 5% (or about 5% to about 100%, or about 5% to about 25%, or about 20% to about 50%, or about 40% to about 70%, or about 50% to about 80%, or about 60% to about 90%, or about 70% to about 100%) of the surface area of the metal or fusible metal alloy particles. When purified to at least substantially remove surfactant or another emulsion stabilizer, the emulsion stabilizers may be present on an outer surface of the metal or fusible metal alloy particles at less than 25% (or 0% to about 25%, or about 0.1% to about 5%, or about 0.1% to about 1%, or about 1% to about 5%, or about 1% to about 10%, or about 5% to about 15%, or about 10% to about 25%) of the surface area of the metal or fusible metal alloy particles. The coverage of the emulsion stabilizers on an outer surface of the metal or fusible metal alloy particles may be determined using image analysis of the scanning electron microscope images (SEM micrographs). The emulsion stabilizers may form a coating that covers at least 5% (or about 5% to about 100%, or about 5% to about 25%, or about 20% to about 50%, or about 40% to about 70%, or about 50% to about 80%, or about 60% to about 90%, or about 70% to about 100%) of the surface area of the metal or fusible metal alloy particles. When purified to at least substantially remove surfactant or another emulsion stabilizer, the emulsion stabilizers may be present on an outer surface of the metal or fusible metal alloy particles at less than 25% (or 0% to about 25%, or about 0.1% to about 5%, or about 0.1% to about 1%, or about 1% to about 5%, or about 1% to about 10%, or about 5% to about 15%, or about 10% to about 25%) of the surface area of the metal or fusible metal alloy particles. The coverage of the emulsion stabilizers on an outer surface of the metal or fusible metal alloy particles may be determined using image analysis of the SEM micrographs.

Further, where voids form inside the molten metal or fusible metal alloy droplets, emulsion stabilizers should generally be at (and/or embedded in) the interface between the interior of the void and the metal or fusible metal alloy. The voids generally do not contain metal or fusible metal alloy. Rather, the voids may contain, for example, carrier fluid, air, or be void. The metal or fusible metal alloy particles described herein may comprise carrier fluid at about 5 wt % or less (or about 0.001 wt % to about 5 wt %, or about 0.001 wt % to about 0.1 wt %, or about 0.01 wt % to about 0.5 wt %, or about 0.1 wt % to about 2 wt %, or about 1 wt % to about 5 wt %) of the metal or fusible metal alloy particles.

Applications of Metal or Metal Alloy Particles

The present disclosure also relates to application of the metal or fusible metal alloy particles (e.g., metal or fusible metal alloy particles) described herein. For example, the metal or fusible metal alloy particles may be useful in applications that include, but are not limited to, paints, powder coatings, ink jet materials, electrophotographic toners, 3D printing, solder powder, abrasives, metal catalyst powders, thermal management additives, and the like.

For example, methods of selective laser sintering may comprise: depositing (a) the metal or fusible metal alloy particles comprising (a1) a metal or a fusible metal alloy and optionally (a2) additives described herein (e.g., emulsion stabilizer) and optionally (b) metal or fusible metal alloy particles different than the particles (a) onto a surface; and once deposited, exposing at least a portion of the particles (a) and (b) (if included) to a laser to fuse the particles (a) and (b) (if included) and form a consolidated body.

The metal or fusible metal alloy particles described herein may be used to produce a variety of articles. By way of nonlimiting example, 3-D printing processes of the present disclosure may comprise: depositing particles (e.g., the foregoing particles (a) and (b) (if included)) described herein upon a surface (e.g., in layers and/or in a specified shape), and once deposited, heating at least a portion of the particles to promote consolidation thereof and form a consolidated body (or object). The consolidated body may have a void percentage of about 5% or less (e.g., 0% to about 5%, or about 0.5% to about 2%, or about 1% to about 3%, or about 2% to about 5%) after being consolidated. For example, heating and consolidation of the metal or fusible metal alloy particles (e.g., metal or fusible metal alloy particles 120/126 and other metal or fusible metal alloy particles) may take place in a 3-D printing apparatus employing a laser, such that heating and consolidation take place by selective laser sintering.

Examples of articles that may be produced by such methods where the metal or fusible metal alloy particles may be used to form all or a portion of said articles include, but are not limited to, particles, films, packaging, toys, household goods, automotive parts, aerospace/aircraft-related parts, containers (e.g., for food, beverages, cosmetics, personal care compositions, medicine, and the like), furniture parts, decorative home goods, plastic gears, screws, nuts, bolts, cable ties, jewelry, art, sculpture, medical items, prosthetics, orthopedic implants, production of artifacts that aid learning in education, 3D anatomy models to aid in surgeries, robotics, biomedical devices (orthotics), home appliances, dentistry, electronics, sporting goods, and the like.

Further, the metal or fusible metal alloy particles described herein may be used in applications beyond additive manufacturing. For example, the metal or fusible metal alloy particles described herein may be used in barrier coatings. The barrier coatings may be useful for paper and packaging materials.

In additional examples, the metal or fusible metal alloy particles described herein may be used in adhesives, batteries (e.g., in the cathode and/or anode material), and wound dressings.

Example Embodiments

A first nonlimiting example embodiment is a method comprising: mixing a mixture comprising: (a) a metal or a metal alloy (e.g., metal or a fusible metal alloy), (b) a carrier fluid, and optionally (c) an emulsion stabilizer at a temperature at or greater than a melting point of the metal or the metal alloy to create a dispersion of molten droplets of the metal or the metal alloy dispersed in the carrier fluid; cooling the mixture to below the melting point of the metal or the metal alloy to form metal or metal alloy particles (e.g., metal or a fusible metal alloy particles); and separating the metal or metal alloy particles from the carrier fluid, wherein the metal or metal alloy particles comprise the metal or the metal alloy and the emulsion stabilizer, if included. The first nonlimiting example embodiment may include one or more of: Element 1: wherein the metal or the metal alloy is the metal with the melting point of about 350° C. or less; Element 2: wherein the metal or the metal alloy is the metal alloy that comprises one or more of: tin, antimony, copper, bismuth, zinc, and silver; Element 3: wherein the metal or the metal alloy is present in the mixture in an amount of at about 5 wt % to about 75 wt % of the mixture; Element 4: the method further comprising: combining (i) the carrier fluid at a temperature within about 30° C. of the melting point of the metal or the metal alloy and (ii) the metal or the metal alloy at a temperature within about 10° C. of the melting point of the metal or the metal alloy; Element 5: wherein the emulsion stabilizer is present in the mixture, and wherein the emulsion stabilizer covers at least a portion of a surface of the metal or metal alloy particles; Element 6: wherein the emulsion stabilizer is present in the mixture and comprises a nanoparticle emulsion stabilizer, and wherein at least some of the nanoparticle emulsion stabilizers are embedded in a surface of the metal or metal alloy particles; Element 7: wherein the metal or metal alloy particles have a circularity of about 0.90 to about 1.0; Element 8: wherein the metal or metal alloy particles have an angle of repose of about 25° to about 45°; Element 9: wherein the metal or metal alloy particles have a Hausner ratio of about 1.0 to about 1.5; Element 10: wherein the metal or metal alloy particles have a D10 of about 0.1 μm to about 125 μm, a D50 of about 0.5 μm to about 200 μm, and a D90 of about 3 μm to about 300 μm, wherein D10<D50<D90; Element 11: wherein the metal or metal alloy particles have a diameter span of about 0.2 to about 10; and Element 12: wherein the metal or metal alloy particles have a BET surface area of about 10 m²/g to about 500 m²/g. Examples of combinations include Element 1 in combination with one or more of Elements 2-12, Element 2 in combination with one or more of Elements 3-12, Element 3 in combination with one or more of Elements 4-12, Element 4 in combination with one or more of Elements 5-12, Element 5 in combination with one or more of Elements 6-12, Element 6 in combination with one or more of Elements 7-12, Element 7 in combination with one or more of Elements 8-12, Element 8 in combination with one or more of Elements 9-12, Element 9 in combination with one or more of Elements 10-12, and two or more of Elements 10-12 in combination.

A second nonlimiting example embodiment is a selective laser sintered article comprising: the metal or metal alloy particles (e.g., metal or a fusible metal alloy particles) produced according to the method of the first nonlimiting example embodiment (optionally in combination with one or more of Elements 1-12).

A third nonlimiting example embodiment is the metal or metal alloy particles (e.g., metal or a fusible metal alloy particles) produced by the method of the first nonlimiting example embodiment (optionally in combination with one or more of Elements 1-12).

A fourth nonlimiting example embodiment is a composition comprising: metal or metal alloy particles (e.g., metal or a fusible metal alloy particles) comprising (a) a metal or a metal alloy (e.g., metal or a fusible metal alloy) and (b) an emulsion stabilizer. The fourth nonlimiting example embodiment may include one or more of: Element 13: wherein the emulsion stabilizer covers at least a portion of a surface of the metal or metal alloy particles; Element 14: wherein the emulsion stabilizer comprises a nanoparticle emulsion stabilizer, and wherein at least some of the nanoparticle emulsion stabilizers are embedded in a surface of the metal or metal alloy particles; Element 15: wherein the metal or metal alloy particles have an angle of repose of about 25° to about 45°; Element 16: wherein the metal or metal alloy particles have a Hausner ratio of about 1.0 to about 1.5; Element 17: wherein the metal or metal alloy particles have a D10 of about 0.1 μm to about 125 μm, a D50 of about 0.5 μm to about 200 μm, and a D90 of about 3 μm to about 300 μm, wherein D10<D50<D90; Element 18: wherein the metal or metal alloy particles have a diameter span of about 0.2 to about 10; Element 19: wherein the metal or metal alloy particles have a BET surface area of about 10 m²/g to about 500 m²/g; and Element 20: wherein the metal or metal alloy particles are first metal or metal alloy particles, and wherein the composition further comprises: second metal or metal alloy particles that are different in composition than the first metal or metal alloy particles. Examples of combinations include Element 13 in combination with one or more of Elements 14-20, Element 14 in combination with one or more of Elements 15-20, Element 15 in combination with one or more of Elements 16-20, Element 16 in combination with one or more of Elements 17-20, Element 17 in combination with one or more of Elements 18-20, and two or more of Elements 18-20 in combination.

A fifth nonlimiting example embodiment is a selective laser sintered article comprising: the metal or metal alloy particles (e.g., metal or a fusible metal alloy particles) of the fourth nonlimiting example embodiment (optionally in combination with one or more of Elements 13-20).

A sixth nonlimiting example embodiment is a method comprising: depositing the composition of the fourth nonlimiting example embodiment (optionally in combination with one or more of Elements 13-20) upon a surface; and once deposited, heating at least a portion of the metal or metal alloy particles (e.g., metal or a fusible metal alloy particles) to promote consolidation thereof and form a consolidated body. The heating may be achieved by selective laser sintering. The consolidated body may have a void percentage of about 5% or less.

Clauses

Clause 1. A method comprising: mixing a mixture comprising: (a) a metal or a metal alloy, (b) a carrier fluid, and optionally (c) an emulsion stabilizer at a temperature at or greater than a melting point of the metal or the metal alloy to create a dispersion of molten droplets of the metal or the metal alloy dispersed in the carrier fluid; cooling the mixture to below the melting point of the metal or the metal alloy to form metal or metal alloy particles; and separating the metal or metal alloy particles from the carrier fluid, wherein the metal or metal alloy particles comprise the metal or the metal alloy and the emulsion stabilizer, if included.

Clause 2. The method of Clause 1, wherein the metal or the metal alloy is the metal with the melting point of about 350° C. or less.

Clause 3. The method of Clause 1, wherein the metal or the metal alloy is the metal alloy that comprises one or more of: tin, antimony, copper, bismuth, zinc, and silver.

Clause 4. The method of Clause 1, wherein the metal or the metal alloy is present in the mixture in an amount of at about 5 wt % to about 75 wt % of the mixture.

Clause 5. The method of Clause 1 further comprising: combining (i) the carrier fluid at a temperature within about 30° C. of the melting point of the metal or the metal alloy and (ii) the metal or the metal alloy at a temperature within about 10° C. of the melting point of the metal or the metal alloy.

Clause 6. The method of Clause 1, wherein the emulsion stabilizer is present in the mixture, and wherein the emulsion stabilizer covers at least a portion of a surface of the metal or metal alloy particles.

Clause 7. The method of Clause 1, wherein the emulsion stabilizer is present in the mixture and comprises a nanoparticle emulsion stabilizer, and wherein at least some of the nanoparticle emulsion stabilizers are embedded in a surface of the metal or metal alloy particles.

Clause 8. The method of Clause 1, wherein the metal or metal alloy particles have a circularity of about 0.90 to about 1.0.

Clause 9. The method of Clause 1, wherein the metal or metal alloy particles have an angle of repose of about 25° to about 45°.

Clause 10. The method of Clause 1, wherein the metal or metal alloy particles have a Hausner ratio of about 1.0 to about 1.5.

Clause 11. The method of Clause 1, wherein the metal or metal alloy particles have a D10 of about 0.1 µm to about 125 µm, a D50 of about 0.5 µm to about 200 µm, and a D90 of about 3 µm to about 300 µm, wherein D10<D50<D90.

Clause 12. The method of Clause 1, wherein the metal or metal alloy particles have a diameter span of about 0.2 to about 10.

Clause 13. The method of Clause 1, wherein the metal or metal alloy particles have a BET surface area of about 10 $m^2/g$ to about 500 $m^2/g$.

Clause 14. A selective laser sintered article comprising: the metal or metal alloy particles produced according to the method of Clause 1.

Clause 15. A composition comprising: metal or metal alloy particles comprising (a) a metal or a metal alloy and (b) an emulsion stabilizer.

Clause 16. The composition of Clause 15, wherein the emulsion stabilizer covers at least a portion of a surface of the metal or metal alloy particles.

Clause 17. The composition of Clause 15, wherein the emulsion stabilizer comprises a nanoparticle emulsion stabilizer, and wherein at least some of the nanoparticle emulsion stabilizers are embedded in a surface of the metal or metal alloy particles.

Clause 18. The composition of Clause 15, wherein the metal or metal alloy particles have an angle of repose of about 25° to about 45°.

Clause 19. The composition of Clause 15, wherein the metal or metal alloy particles have a Hausner ratio of about 1.0 to about 1.5.

Clause 20. The composition of Clause 15, wherein the metal or metal alloy particles are first metal or metal alloy particles, and wherein the composition further comprises: second metal or metal alloy particles that are different in composition than the first metal or metal alloy particles.

Clause 21. A method comprising: depositing the composition of Clause 15 upon a surface; and once deposited, heating at least a portion of the metal or metal alloy particles to promote consolidation thereof and form a consolidated body.

Clause 22. The method of Clause 21, wherein the heating is achieved by selective laser sintering.

Clause 22. The method of Clause 21, wherein the consolidated body has a void percentage of about 5% or less.

Clause 23. A selective laser sintered article comprising: the composition of Clause 15.

Clause 24. A method comprising: mixing a mixture comprising: (a) a metal or a fusible metal alloy, (b) a carrier fluid, and optionally (c) an emulsion stabilizer at a temperature at or greater than a melting point of the metal or the fusible metal alloy to create a dispersion of molten droplets of the metal or the fusible metal alloy dispersed in the carrier fluid; cooling the mixture to below the melting point of the metal or the fusible metal alloy to form metal or fusible metal alloy particles; and separating the metal or fusible metal alloy particles from the carrier fluid, wherein the metal or fusible metal alloy particles comprise the metal or the fusible metal alloy and the emulsion stabilizer, if included.

Clause 25. The method of Clause 24, wherein the metal or the fusible metal alloy is the metal with the melting point of about 350° C. or less.

Clause 26. The method of Clause 24, wherein the metal or the fusible metal alloy is the fusible metal alloy that comprises one or more of: tin, antimony, copper, bismuth, zinc, and silver.

Clause 27. The method of Clause 24, wherein the metal or the fusible metal alloy is present in the mixture in an amount of at about 5 wt % to about 75 wt % of the mixture.

Clause 28. The method of Clause 24 further comprising: combining (i) the carrier fluid at a temperature within about 30° C. of the melting point of the metal or the fusible metal alloy and (ii) the metal or the fusible metal alloy at a temperature within about 10° C. of the melting point of the metal or the fusible metal alloy.

Clause 29. The method of Clause 24, wherein the emulsion stabilizer is present in the mixture, and wherein the emulsion stabilizer covers at least a portion of a surface of the metal or fusible metal alloy particles.

Clause 30. The method of Clause 24, wherein the emulsion stabilizer is present in the mixture and comprises a nanoparticle emulsion stabilizer, and wherein at least some of the nanoparticle emulsion stabilizers are embedded in a surface of the metal or fusible metal alloy particles.

Clause 31. The method of Clause 24, wherein the metal or fusible metal alloy particles have a circularity of about 0.90 to about 1.0.

Clause 32. The method of Clause 24, wherein the metal or fusible metal alloy particles have an angle of repose of about 25° to about 45°.

Clause 33. The method of Clause 24, wherein the metal or fusible metal alloy particles have a Hausner ratio of about 1.0 to about 1.5.

Clause 34. The method of Clause 24, wherein the metal or fusible metal alloy particles have a D10 of about 0.1 μm to about 125 μm, a D50 of about 0.5 μm to about 200 inn, and a D90 of about 3 μm to about 300 μm, wherein D10<D50<D90.

Clause 35. The method of Clause 24, wherein the metal or fusible metal alloy particles have a diameter span of about 0.2 to about 10.

Clause 36. The method of Clause 24, wherein the metal or fusible metal alloy particles have a BET surface area of about 10 $m^2/g$ to about 500 $m^2/g$.

Clause 37. A selective laser sintered article comprising: the metal or fusible metal alloy particles produced according to the method of Clause 24.

Clause 38. A composition comprising: metal or fusible metal alloy particles comprising (a) a metal or a fusible metal alloy and (b) an emulsion stabilizer.

Clause 39. The composition of Clause 38, wherein the emulsion stabilizer covers at least a portion of a surface of the metal or fusible metal alloy particles.

Clause 40. The composition of Clause 38, wherein the emulsion stabilizer comprises a nanoparticle emulsion stabilizer, and wherein at least some of the nanoparticle emulsion stabilizers are embedded in a surface of the metal or fusible metal alloy particles.

Clause 41. The composition of Clause 38, wherein the metal or fusible metal alloy particles have an angle of repose of about 25° to about 45°.

Clause 42. The composition of Clause 38, wherein the metal or fusible metal alloy particles have a Hausner ratio of about 1.0 to about 1.5.

Clause 43. The composition of Clause 38, wherein the metal or fusible metal alloy particles are first metal or fusible metal alloy particles, and wherein the composition further comprises: second metal or fusible metal alloy particles that are different in composition than the first metal or fusible metal alloy particles.

Clause 44. A method comprising: depositing the composition of Clause 38 upon a surface; and once deposited, heating at least a portion of the metal or fusible metal alloy particles to promote consolidation thereof and form a consolidated body.

Clause 45. The method of Clause 44, wherein the heating is achieved by selective laser sintering.

Clause 46. The method of Clause 44, wherein the consolidated body has a void percentage of about 5% or less.

Clause 47. A selective laser sintered article comprising: the composition of Clause 38.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the incarnations of the present inventions. At the very least, and not as an attempt to limit the application of the doctrine of equivalents to the scope of the claim, each numerical parameter should at least be construed in light of the number of reported significant digits and by applying ordinary rounding techniques.

One or more illustrative incarnations incorporating one or more invention elements are presented herein. Not all features of a physical implementation are described or shown in this application for the sake of clarity. It is understood that in the development of a physical embodiment incorporating one or more elements of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

Example 1. A fusible metal wire (a eutectic mixture of copper, bismuth, tin and silver having a melting point of about 220° C.) was used as the fusible metal alloy of this example. Approximately 10 g of 600,000 cSt PDMS was added to an aluminum dish and heated for 5 minutes to approximately 250° C. A 2 g piece of the fusible metal above was added to the heated PDMS oil and allowed to come to the temperature of the hot plate. The mixture was sheared for about one minute to create molten droplets of the fusible metal alloy. The fusible metal alloy was seen to quickly and easily disperse in the PDMS oil. Once formed the molten droplets appeared to be stable in the oil and did not easily coalesce. The sample was removed from the heat and cooled with dry ice. The resultant fusible metal alloy particles were washed with ethyl acetate to lower the viscosity of the PDMS and then collected on filter paper by vacuum filtration.

The particle morphology and particle size was determined using the Keyence digital microscope, which gave a D50 equivalent diameter of 50 μm.

Figure 2:
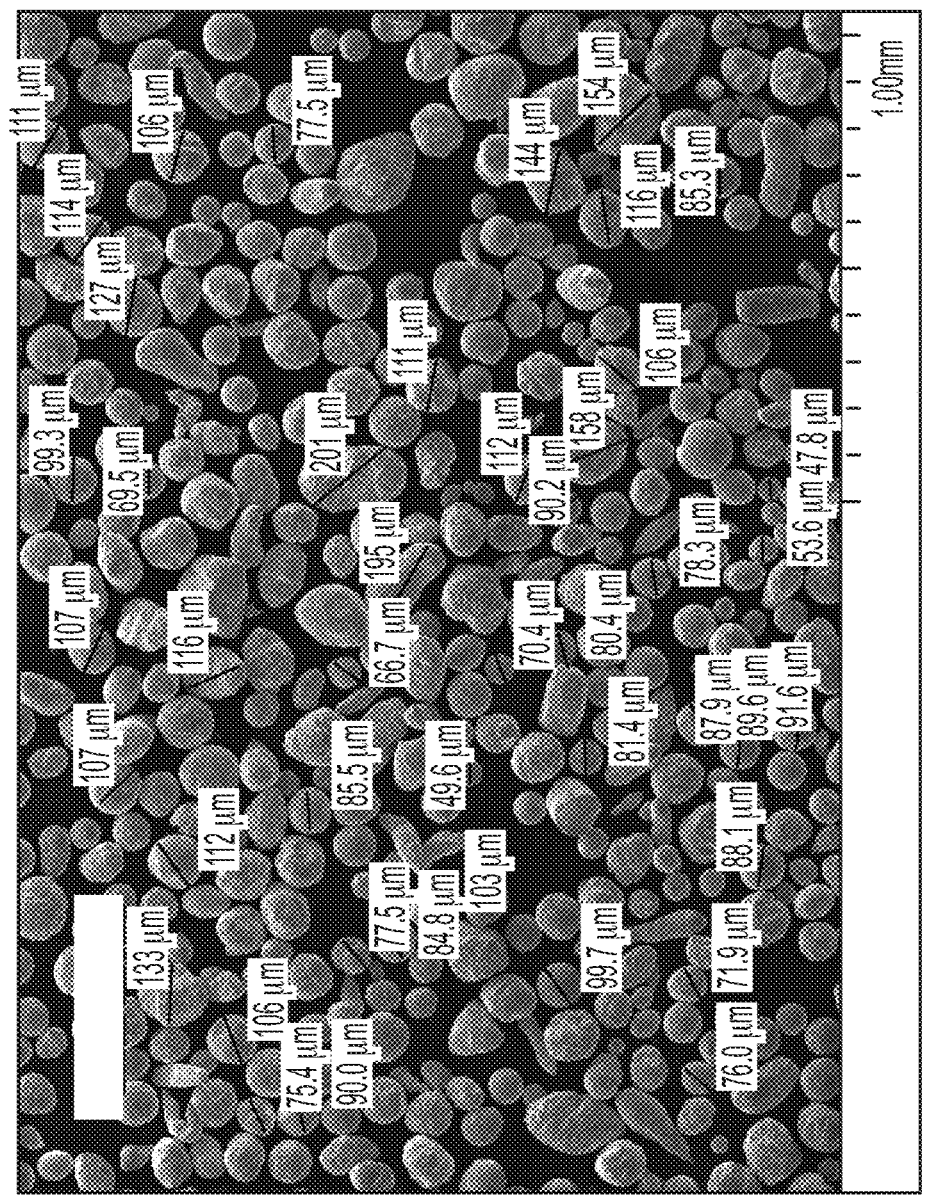
FIGS. 2-3 are scanning electron microscope (SEM) images of fusible metal alloy particles.
Figure 3:
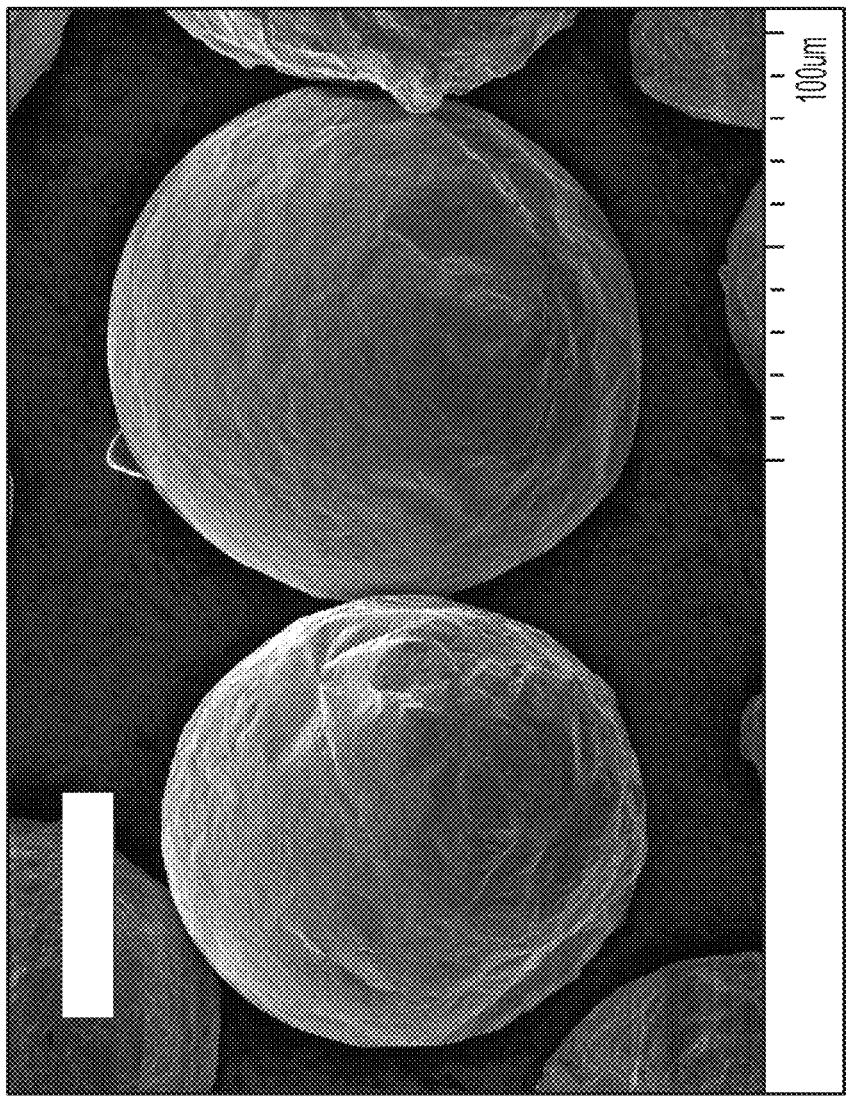

Example 2. A fusible metal wire (SAC0248) was used as the fusible metal alloy of this example. First the Haake mixer was heated to a temperature of about 250° C. Approximately 40 g of 60,000 cSt PDMS was added to the Haake mixer and gently mixed for 5 minutes to allow oil to rise to the mixer temperature. Then, cut metal pieces of the fusible metal alloy (about 20 g) were added through the loading port over 5 minutes and under very low mixing to reduce the likelihood of mixer channel blockages by non-melted metal. After all of the metal material was added the mixer was increased to 100 revolutions per minute (rpm). The load port was then closed and the Haake mixed for 10 minutes. The resulting slurry was discharged onto dry ice and washed with heptane to produce a grey flowable metal powder. SEM images in FIGS. 2-3 illustrate the morphology and approximate particle size of the resultant fusible metal alloy particles.

Figure 4:
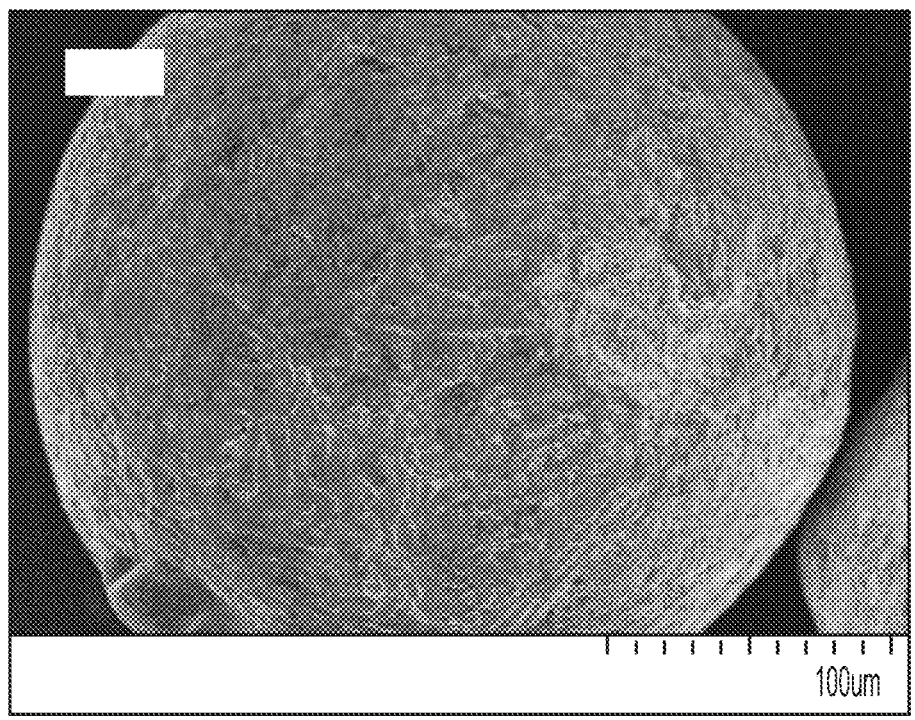
FIGS. 4-6 are SEM images at different magnifications of fusible metal alloy particles produced using a silica particle emulsion stabilizer.
Figure 5:
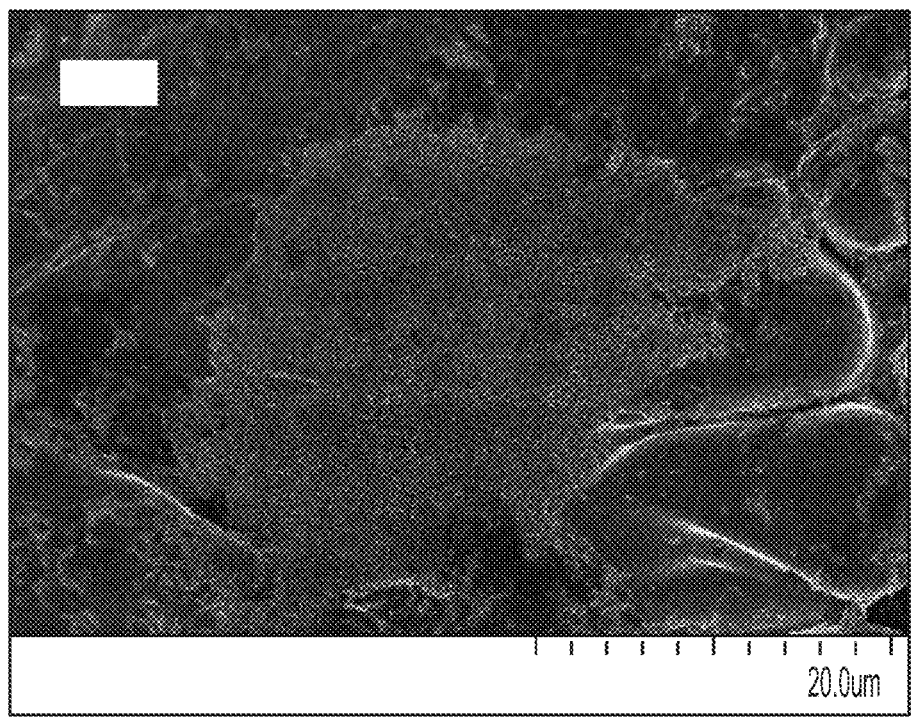
Figure 6:
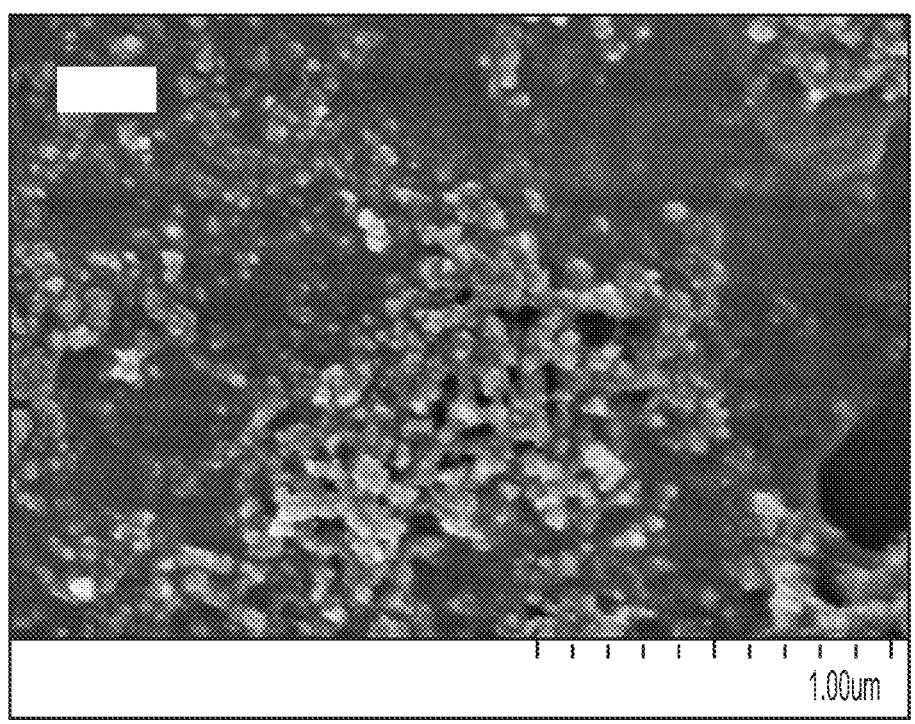
Figure 7:
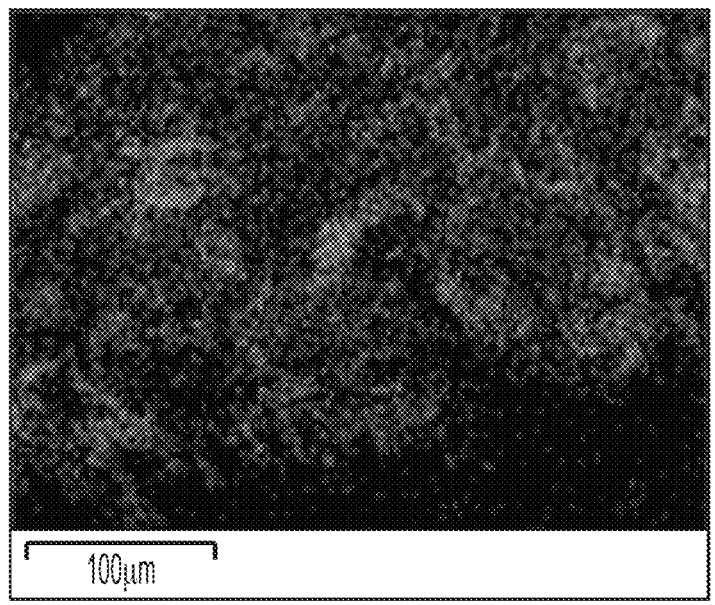
FIG. 7 is an energy dispersive X-ray spectroscopy (EDS) image of the fusible metal alloy particles of FIGS. 4-6 where the lighter areas indicate the presence of silicon.

Example 3. The procedure of Example 2 was repeated but with the inclusion of about 0.6 g of AEROSIL® R812S with the PDMS before addition of the fusible metal alloy. FIGS. 4-6 are SEM images at different magnifications of the resultant particles illustrating that the silica (emulsion stabilizer) is present on the surface of the resultant particles and, in some instance, embedded in the surface of the resultant particles. Further, the resultant particles were analyzed by energy dispersive X-ray spectroscopy (EDS) in the SEM, which showed a distribution of silica on the surface of the resultant particles, see the lighter areas of FIG. 7 for the Si Ka 1 locations indicating the presence of silica. Similarly, the oxygen (O Ka 1) was observed to be in similar locations as the Si Ka 1.

Therefore, the present invention is well adapted to attain the ends and advantages mentioned as well as those that are inherent therein. The particular examples and configurations disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
providing a mixture comprising: (a) a metal or a metal alloy, (b) a carrier fluid, and (c) an emulsion stabilizer comprising nanoparticles selected from the group consisting of metal oxide nanoparticles, aluminosilicate nanoparticles, borosilicate nanoparticles, aluminoborosilicate nanoparticles, silica nanoparticles, and any combination thereof;
shearing the mixture at a temperature of at least the melting point of the metal or the metal alloy to create a dispersion of molten droplets of the metal or the metal alloy dispersed in the carrier fluid;
cooling the dispersion to below the melting point of the metal or the metal alloy to form metal or metal alloy particles from the molten droplets;
wherein the nanoparticles are dispersed upon an outer surface of the metal or metal alloy particles, or the nanoparticles are embedded in the outer surface of the metal alloy or metal alloy particles; and
separating the metal or metal alloy particles from the carrier fluid.

2. The method of claim 1, wherein the metal is present and has a melting point of about 350° C. or less.

3. The method of claim 1, wherein the metal alloy is present and comprises one or more of tin, antimony, copper, bismuth, zinc, or silver.

4. The method of claim 1, wherein the metal or the metal alloy is present in the mixture in an amount of about 5 wt % to about 75 wt % of the mixture.

5. The method of claim 1 further comprising:
combining (i) the carrier fluid at a temperature within about 30° C. of the melting point of the metal or the metal alloy and (ii) the metal or the metal alloy at a temperature within about 10° C. of the melting point of the metal or the metal alloy.

6. The method of claim 1, wherein the nanoparticles comprise silica nanoparticles.

7. The method of claim 1, wherein the metal or metal alloy particles have a circularity of about 0.90 to about 1.0.

8. The method of claim 1, wherein the metal or metal alloy particles have an angle of repose of about 25° to about 45°.

9. The method of claim 1, wherein the metal or metal alloy particles have a Hausner ratio of about 1.0 to about 1.5.

10. The method of claim 1, wherein the metal or metal alloy particles have a D10 of about 0.1 μm to about 125 μm, a D50 of about 0.5 μm to about 200 μm, and a D90 of about 3 μm to about 300 μm, wherein D10<D50<D90.

11. The method of claim 1, wherein the metal or metal alloy particles have a diameter span of about 0.2 to about 10.

12. The method of claim 1, wherein the metal or metal alloy particles have a BET surface area of about 10 m$^2$/g to about 500 m$^2$/g.

13. The method of claim 1, wherein the carrier fluid is polydimethylsiloxane (PDMS).

14. The method of claim 1, wherein the carrier fluid is selected from the group consisting of silicone oil, a fluorinated silicone oil, a perfluorinated silicone oil, a polyethylene glycol, an alkyl-terminal polyethylene glycol, a paraffin, a vison oil, a turtle oil, a soya bean oil, a perhydrosqualene, a sweet almond oil, a calophyllum oil, a palm oil, a parleam oil, a grapeseed oil, a sesame oil, a maize oil, a rapeseed oil, a sunflower oil, a cottonseed oil, an apricot oil, a castor oil, an avocado oil, a jojoba oil, an olive oil, a cereal germ oil, an ester of lanolic acid, an ester of oleic acid, an ester of lauric acid, an ester of stearic acid, a fatty ester, a fatty acid, a fatty alcohol, a polysiloxane modified with fatty acids, a polysiloxane modified with fatty alcohols, a polysiloxane modified with polyoxyalkylenes, and any combination thereof.

15. The method of claim 1, wherein the metal or metal alloy particles have a D10 of about 5 μm to about 30 μm, a D50 of about 30 μm to about 70 μm, and a D90 of about 70 μm to about 120 μm, wherein D10<D50<D90.

16. The method of claim 1, wherein the metal or metal alloy particles have a D10 of about 25 um to about 60 um, a D50 of about 60 um to about 110 um, and a D90 of about 110 um to about 175 um, wherein D10<D50<D90.

17. The method of claim 1, wherein the metal or metal alloy particles have a D10 of about 75 um to about 125 um, a D50 of about 100 um to about 200 um, and a D90 of about 125 um to about 300 um, wherein D10<D50<D90.

* * * * *